US007983303B2

(12) United States Patent
Bargauan

(10) Patent No.: US 7,983,303 B2
(45) Date of Patent: Jul. 19, 2011

(54) MEGA-FRAME INITIALIZATION PACKET GENERATION AND SYNCHRONOUS RE-GENERATION WITH BIT RATE ADAPTATION FOR SINGLE FREQUENCY NETWORKS WITH MULTIPLE MODULATION SCHEMES

(75) Inventor: Michele Bargauan, Novate Milanese (IT)

(73) Assignee: Screen Service Broadcasting Technologies S.p.A. (IT)

( * ) Notice: Subject to any disclaimer, the term of this patent is extended or adjusted under 35 U.S.C. 154(b) by 448 days.

(21) Appl. No.: 12/139,932

(22) Filed: Jun. 16, 2008

(65) Prior Publication Data
US 2008/0310533 A1 Dec. 18, 2008

Related U.S. Application Data

(60) Provisional application No. 60/929,169, filed on Jun. 15, 2007, provisional application No. 60/929,170, filed on Jun. 15, 2007.

(51) Int. Cl.
*H04J 3/24* (2006.01)
*H04J 3/00* (2006.01)
*H04K 1/00* (2006.01)
*H04L 27/28* (2006.01)

(52) U.S. Cl. ......... 370/473; 370/474; 370/476; 375/260

(58) Field of Classification Search .................. None
See application file for complete search history.

(56) References Cited

U.S. PATENT DOCUMENTS

| 7,843,969 | B2 | 11/2010 | Bargauan | |
| 2001/0006535 | A1* | 7/2001 | Csomo | 375/240.27 |
| 2001/0024456 | A1 | 9/2001 | Zaun et al. | |
| 2002/0006171 | A1 | 1/2002 | Nielsen | |
| 2003/0112883 | A1* | 6/2003 | Ihrie et al. | 375/260 |
| 2005/0169181 | A1 | 8/2005 | Kim et al. | |
| 2005/0190872 | A1 | 9/2005 | Seong et al. | |
| 2006/0088023 | A1* | 4/2006 | Muller | 370/350 |
| 2007/0074267 | A1 | 3/2007 | Clerget et al. | |
| 2007/0091857 | A1* | 4/2007 | Elstermann | 370/338 |
| 2007/0286245 | A1 | 12/2007 | Yamada | |
| 2008/0107099 | A1* | 5/2008 | Dolgonos | 370/349 |
| 2008/0310453 | A1 | 12/2008 | Bargauan | |

(Continued)

FOREIGN PATENT DOCUMENTS
EP   1 083 688   3/2001
(Continued)

OTHER PUBLICATIONS

"Digital Video Broadcasting (DVB): DVB mega-frame for Single Frequency Network (SFN) synchronication; ETSI TS 101 191" ETSI Standards, LIS, Sophia Antipolis Cedex, France, vol. BC, No. V1.4.1, Jun. 2004.

(Continued)

*Primary Examiner* — Xavier Szewai Wong
(74) *Attorney, Agent, or Firm* — Andrew Bodendorf

(57) ABSTRACT

A system and processes create a Mega-frame Initialization Packet such that remote MIP inserters can regenerate Transport Stream bit rate and MIPs for Single Frequency Networks with modulation schemes different from an incoming stream in a totally deterministic way. This process guarantees that all MIP re-generators having the same signal at the input and having the same modulation scheme generate exactly the same stream (bit exact) even in multiple locations.

20 Claims, 3 Drawing Sheets

U.S. PATENT DOCUMENTS

| | | |
|---|---|---|
| 2008/0310460 A1 | 12/2008 | Bargauan |
| 2009/0122200 A1 | 5/2009 | Tatsumi |

FOREIGN PATENT DOCUMENTS

| | | |
|---|---|---|
| EP | 1 175 008 | 1/2002 |
| EP | 1 503 592 | 2/2005 |
| EP | 1 768 285 | 3/2007 |
| WO | WO 2006/084361 | 8/2006 |

OTHER PUBLICATIONS

"Digital Video Braodcasting (DVB); Framing structure, channel coding and modulation for digital terrestrial television" ETSI EN 300 744, V1.4.1, Jan. 2001.

"Digital Video Broadcasting (DVB); Implementation Guidelines for DVB terrestrial services; Transmission aspects" TR 101 190, V1.1.1, Dec. 1997, pp. 1-77.

\* cited by examiner

MEGA-FRAME INITIALIZATION PACKET GENERATION AND SYNCHRONOUS RE-GENERATION WITH BIT RATE ADAPTATION FOR SINGLE FREQUENCY NETWORKS WITH MULTIPLE MODULATION SCHEMES

CROSS-REFERENCE TO RELATED APPLICATIONS

This application claims the benefit under 35 U.S.C. §119 (e) of U.S. Provisional Application No. 60/929,170 titled "Mega-frame Initialization Packet Generation and Synchronous Re-generation with Bit Rate Adaptation for Single Frequency Networks with Multiple Modulation Schemes" filed on Jun. 15, 2007 in the U.S. Patent and Trademark Office, and of U.S. Provisional Application No. 60/929,169 titled "Deterministic Program Clock Reference Re-stamping for Synchronous Bit Rate Adaptation based on Mega-frame Initialization Packet" filed on Jun. 15, 2007 in the U.S. Patent and Trademark Office, of which the entire disclosures of both are herein incorporated by reference in their entirety for all purposes.

TECHNICAL FIELD

The following description relates generally to any other system where multiple modulation schemes are possible and must deliver a deterministic and identical bit stream at all participating locations.

BACKGROUND

European Telecommunications Standards Institute-European Standard ETSI EN 300 744 describes a broadcasting system for terrestrial distribution based on Orthogonal Frequency-Division Multiplexing COFDM (a digital multi-carrier modulation scheme that uses a large number of closely-spaced orthogonal subcarriers) and MPEG2 (encoding and transport data system, for example, as defined by ISO/IEC 13818-1.MPEG) technologies. Application of the European Telecommunications Standards Institute-Technical Specification ETSI ETS 101 191 extend the user of this system to Single Frequency Networks (SFN), for example, as defined by ETS 101 191 and in Advanced Television Systems Committee (ATSC) A110.

The extension to SFN is accomplished by periodically adding one packet including synchronization time stamps and modulation parameters information to the transport stream (e.g., as defined by ISO 138181-1) of all transmitters broadcasting in a SFN area. Synchronization time stamps indicates the time interval between a reference time and the start of the next Mega-frame, for example, as defined by ETS 101 191. The packet that is added to the transport stream is a Mega-frame Initialization Packet (MIP). The MIP is an MPEG2 transport stream compliant packet that carries mega-frame and modulation parameters, for example, as defined by ETS 101 191.

SUMMARY

In one general aspect, a method of creating transport streams in a single frequency network having multiple modulation schemes is described below. The method may include receiving input transport stream packets including a number of mega frames; extracting mega frame information from the packets; determining the start of a mega frame; counting the packets; generating an MIP packet including a special watermark based on the extracted MF information, the packet count, and modulation parameters; and inserting the MIP packet in each mega frame of an output transport stream of packets at a position in the mega frame corresponding to the number of the mega frame in the output transport stream; and outputting the transport stream.

The method also may include restarting the counting at the start of every mega frame.

The special watermark may be an extended synchronization function placed in the function field of the MIP. The function field may include a function length, an extra long mega frame (EMF) pointer, and continuity counter sync values. The continuity counter sync values may be an integer rounded to infinity of a ratio between the integral of a master mega frame period and a mega frame period of a regenerated guard time.

The special watermark also may be a pointer value that changes over a period of an extra long mega frame (EMF). The pointer may be computed as a linear increment between two values A and B, where the pointer value starts at A and increases with each received MIP up to a value of A+B−1 and where A+B is less than the number of transport stream packets in a mega frame minus one. B may be chosen based on the guard interval of a specific location in the network.

The pointer value may be codes with values signal reset times of EMF counters.

Each timing element of any regenerated transport stream in the network may be derived from a local counter that is reset every extra long mega frame period and the local counter is synchronized each mega frame based on the watermark of the MIP.

Other features will be apparent from the detailed description, drawings, and claims.

BRIEF DESCRIPTION OF THE DRAWINGS

Throughout the drawings and the detailed description, like reference numerals refer to the like elements.

DETAILED DESCRIPTION

The following description provides examples of a system and a method allowing a single transport stream to feed several SFN areas using different modulation parameters and performing bit rate adaptation and MIP insertion at each transmitter while keeping SFN requirements of an identical bit stream at every transmitter (and fully complying with above-mentioned standards).

Transport streams suitable for DVB SFN systems are defined by ETSI standard. The standard defines a bit rate and a synchronization packet (MIP) for each set of four parameters: channel Band Width (BW), Guard Time interval (GT), for example, as defined by EN 300 744. Constellation (CON), and Forward Error Correction ratio (FEC). The SFN transport stream must be the same (i.e., all bits in the stream must be equal bit after bit) at all transmitters broadcasting in an SFN area. Some examples where the parameters require changing are as follows:

Receiving an 8 MHz BW incoming signal which must be broadcast to an area where a 7 MHz channel is required (e.g., often the case in Italy and Germany where channels have mixed BW);

Receiving an ¼GT+x/xFEC incoming signal (e.g., where ¼GT is used in a main transmitter for optimum SFN performance) which must be broadcast to an area where a smaller GT (e.g., 1⁄32GT, used in small area coverage) may be used and a more robust y/yFEC provides increased signal protection for a lower power transmitter;

Receiving a 1⁄32GT+x/xFEC incoming signal (e.g., 1⁄32GT is used in main transmitter where SFN operation is not required) which must be broadcast to SFN mode where an improved GT (e.g., ⅛GT, used in medium area SFN coverage) may be used and a less robust y/yFEC provides a similar payload.

In these examples, when the transport stream changes from one set of parameters to another, the change in the transport stream bit rate, MIP, and PCR information must be determined. In a conventional system, the change in bit rate is made in a random way by inserting or subtracting null packets from an incoming transport stream and inserting a new MIP packet in a new random position. However, the process does not guarantee that the bit stream at two different locations will be exactly the same in each bit (i.e., bit exact). These small differences in PCR correction values are normally made between different locations. The following description provides determining the transport stream bit rate and MIP to provide a bit stream that is bit exact even in two different locations.

Figure 1:
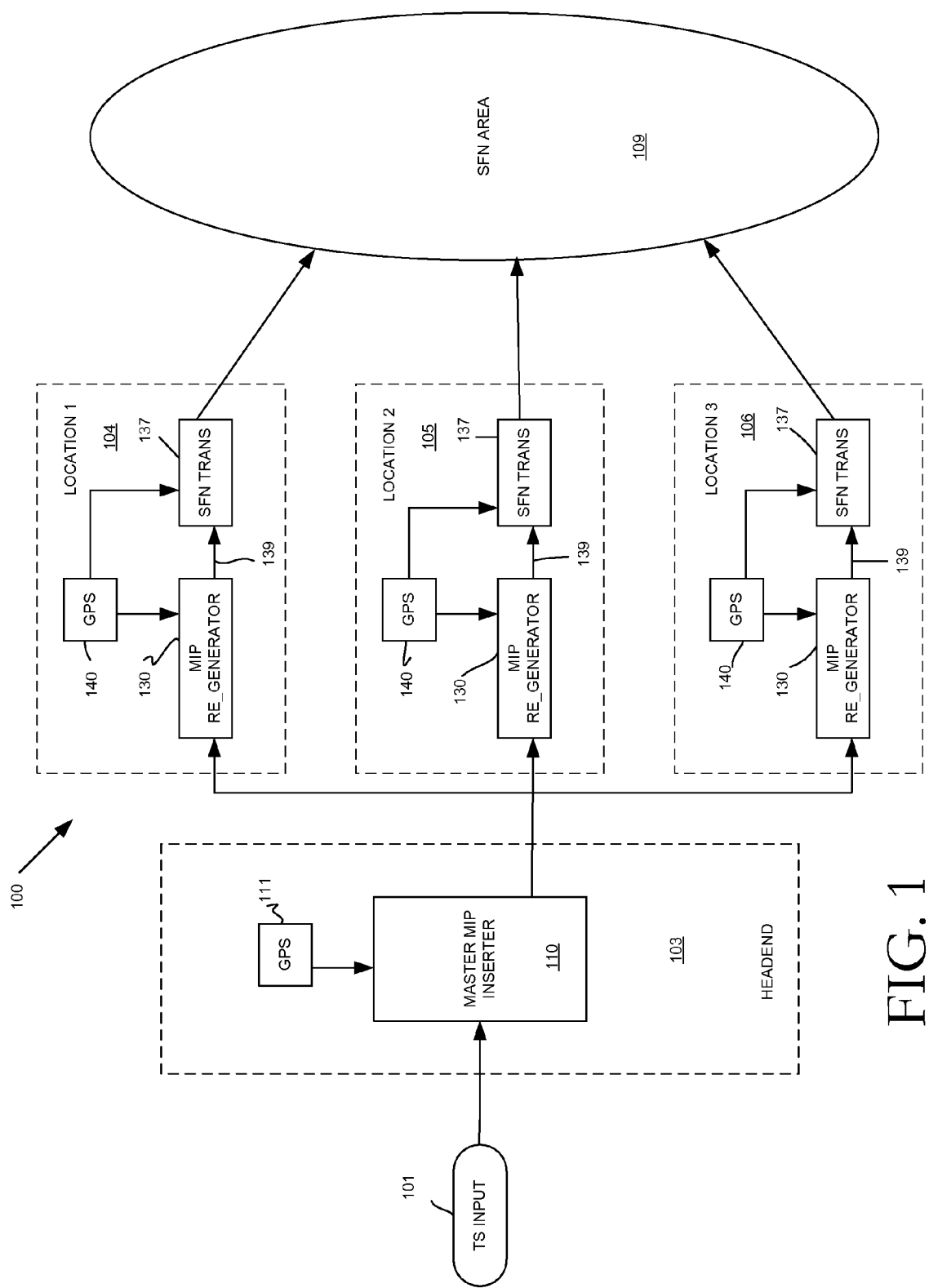
FIG. 1 is an exemplary block diagram of a system for single frequency networks.

FIG. 1 shows an exemplary system 100 for a transport stream distribution in a SFN. The transport stream may be any stream of digital packets, for example, as described by ISO 138181-1. The transport stream 101 is provided as an input at a head end 103 for distribution to a number of locations 104, 105, and 106 broadcasting to SFN area 109. The head end 103 includes a master MIP inserter 110 and timing reference 111, such as, for example, a Global Positioning System (GPS), part of NAVISTAR GPS managed by US Department of Defense receiver. The transport stream is provided to multiple remote locations 104, 105, and 106. The remote location receiving the transport stream which is provided to a MIP re-generator 130 at each location. The transport stream is provided to transmitters 137 and broadcast to the SFN area 109. The MIP re-generator 130 and transmitter 137 also receive a reference timing signal from a respective GPS receiver 140. Therefore, the master MIP inserter 110, the MIP re-generator 130, and transmitters 137 are each provided an exact frequency and timing reference (e.g., a specified by ETS 101 191) from a reference, such as a GPS receiver 140. The master MIP inserter and MIP re-generator are described in further detail below, with respect to FIGS. 2 and 3 respectively.

It will be appreciated that the locations and SFN area are for illustrative purposes only. Any number of locations may be serviced and various configurations of transmitters may be used to service the area 109; however, these are outside the scope of this description.

Figure 2:
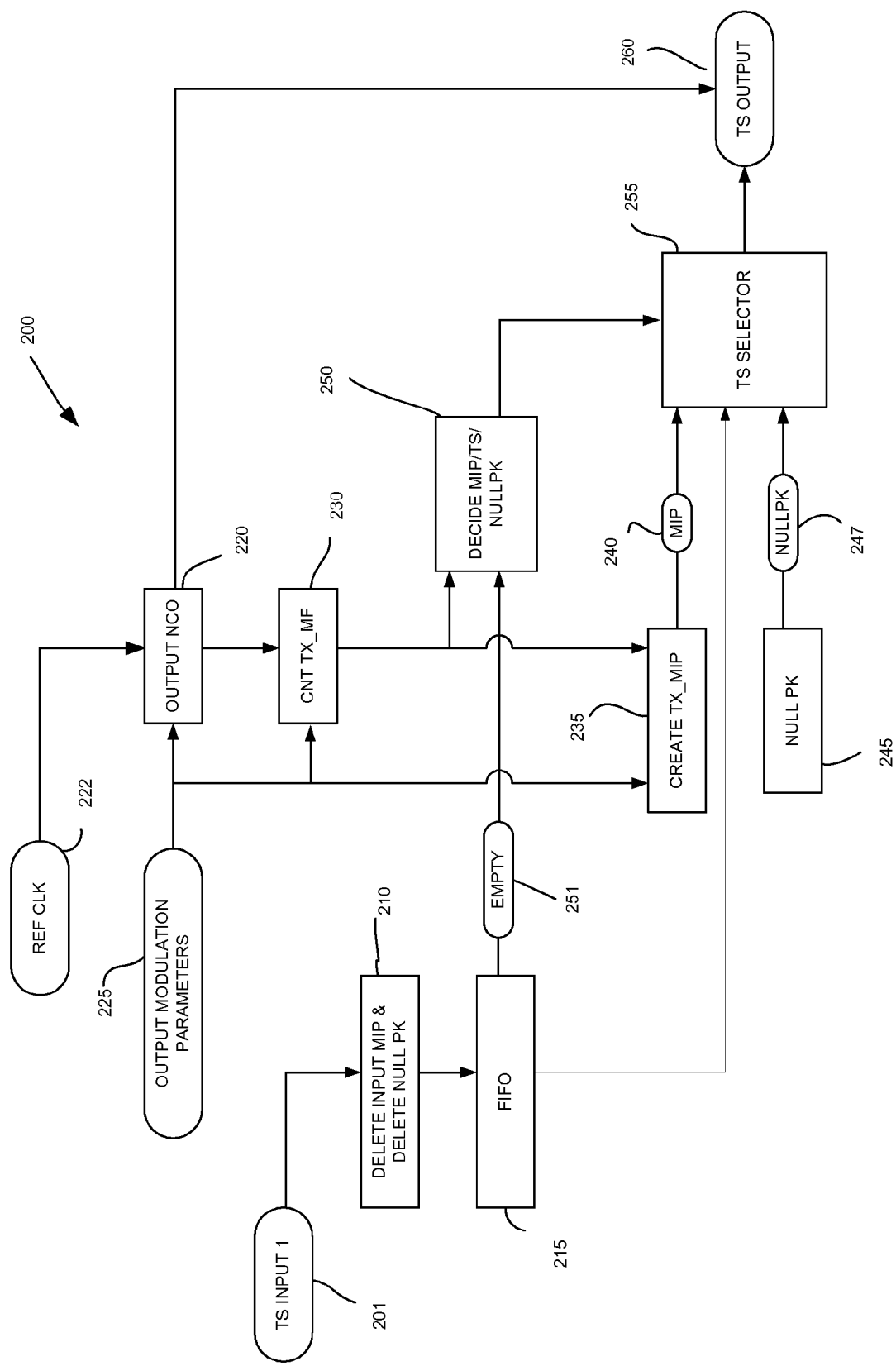
FIG. 2 is an exemplary block diagram of a master MIP inserter for use in the system of FIG. 1.

FIG. 2 shows an example of a master MIP inserter 110 for use in the system of FIG. 1. The master MIP inserter 110 receives a transport stream input (TS input) 201. The transport stream is provide to detector 210 which detects and deletes all null packets and MIP packets from the transport stream input signal. All remaining packets from the TS input 201 are passed to a memory 215. The memory may be a First In-First Out (FIFO) memory where first data written in are the first read out.

A numeric controlled oscillator (NCO) 220 generates an output bit rate from a local reference 222 (e.g., GPS receiver 111 timing signal) and output modulation parameters 225. Examples of the output modulation parameters include, constellation, bandwidth, FEC, and guard time.

The output bit rate is provided to counter 230 along with the output modulation parameters 225. The counter 230 counts the transport stream packets, frames, and mega-frames according to the output modulation parameters 225. A mega-frame is a group of an integer number of TS packets, for example, as defined by ETS 101 191

The output modulation parameters 225 and count signal are provided to the MIP packet generator 235 to create the output MIP packets 240. According to a metric insertion process selected (as described in further detail below), a private function carrying an extra-long mega frame pointer is computed and added to the pointer field of the MIP packet. Alternatively, a dynamic pointer value is computed and inserted in the pointer field of the MIP packet. All other fields of the MIP may be set according to the output modulation parameters 225, the ETS 101 191 rules, and any user requirements.

A packet creator 245 creates null packets 247 according to ISO 13818-1.

Processor 250 receives the count from counter 230 and a signal 251 indicating the memory 215 is empty. For each count of from counter 230, the processor determines whether to insert a null packet, a MIP with output parameters, or a packet from the FIFO. The determination is based on a maximum priority for the MIP, normal priority for transport stream packets, and lowest priority for null packets in the case the FIFO is empty. The transport stream selector receives an indicator of what type of packet to insert in the transport stream. According to the indication, the selector create the output transport stream, selecting between MIP packets 240, transport stream packets read from the FIFO memory 215, and null packets 247. The output transport stream is delivered to output connector TS output 260 according to the output bit rate determined by the NCO 220.

Figure 3:
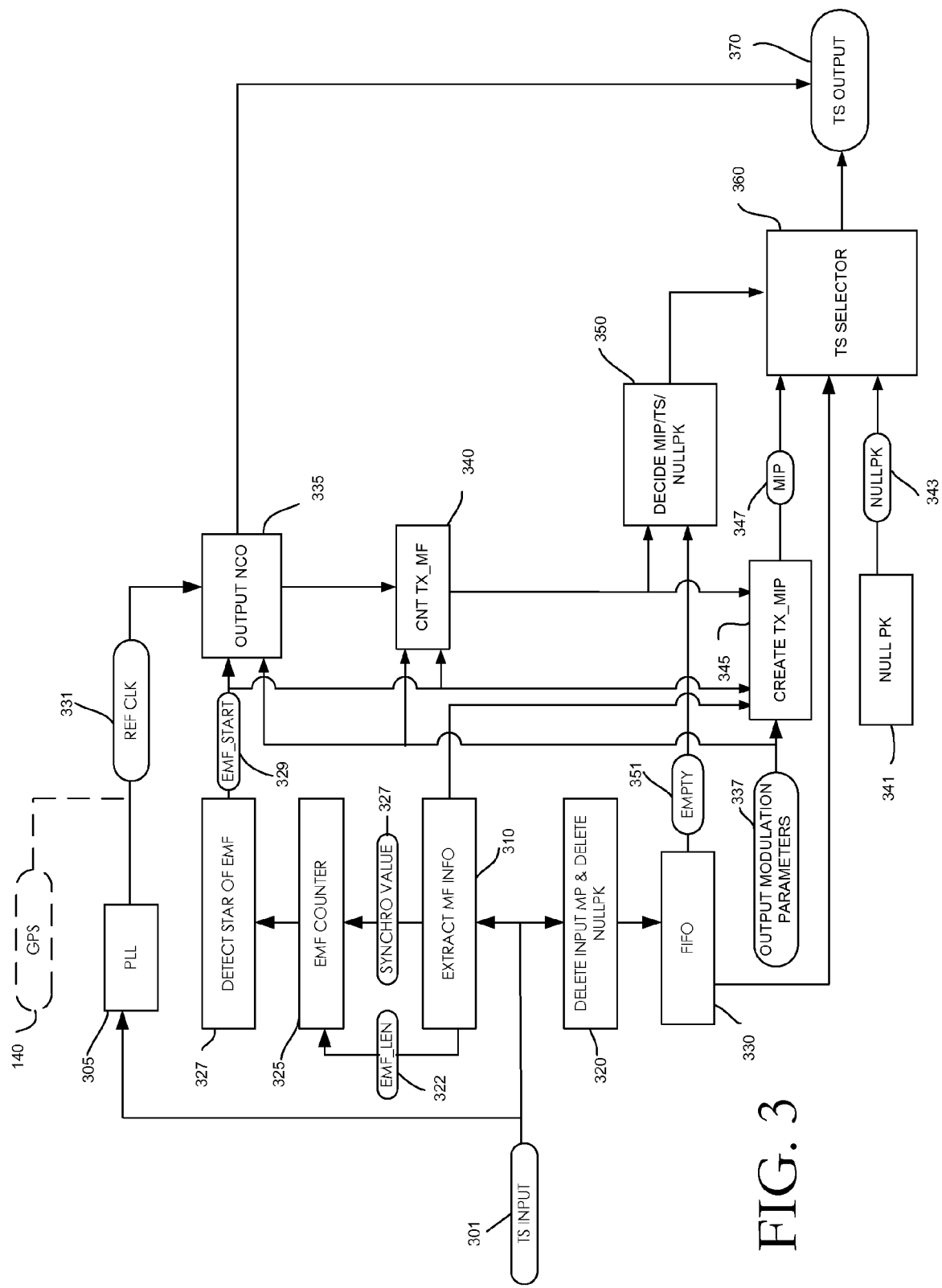
FIG. 3 is an exemplary block diagram of a MIP re-generator use in the system of FIG. 1.

FIG. 3 shows an example of a remote MIP re-generator 130 for use in the system of FIG. 1. The remote MIP re-generator receives that transport stream at input 301. The transport stream is provided to a phase locked loop 305, a detector 310, and a detector 320.

Detector 310 detects any MIP packets present in the input transport stream and extracts the MIP parameters and functions from the MIP packet. The detector 310 generates a synchro value 321 and an EMF_LEN 322. The synchro value is determined from the extended synchronization function if an extra-long mega frame pointer is detected; otherwise, it is the value of MIP pointer field. If the MIP pointer value is used, the synchro value may be valid only for some incoming MIP. In addition, the extra-long mega frame length EMF_LEN 322 is computed from the modulation parameters in the TPS field of the MIP.

Counter 325 counts every mega frame using the incoming MIP as a clock pulse with a period equal to the extra-long mega frame length. The counter 325 is synchronized with the synchro value 322 when valid. The detector 327 detects the start of an extra-long mega frame when the counter 325 reaches zero, and generates the EMF_START pulse 329.

Detector 320 deletes all null packets and MIP packets from the input transport stream, and provides the remaining packets to a memory 330, e.g., a FIFO storage area.

To determine an output clock, the system needs a reference. The reference may be obtained via a PLL 305 locked to the input transport stream to generate the clock reference signal 331. Alternatively, an external reference like a GPS receiver 140 may be used to generate the reference clock 331. The reference clock 331 is provided to the NCO 335.

The NCO 335 generates an output bit rate for the output transport stream from the clock reference 331, the output modulation parameters 337, and the EMF_START pulse 329 which resets the NCO 335.

A transmitter counter 340 counts the transport stream packets, frames, mega frames, and extra-long mega frames according to output modulation parameters 337. The counter 340 may be continuity counter with a 4-bit field incrementing with each transport stream packet with the same packet ID, for example, as defined in ISO 13818-1. The counter 340 is reset by the EMF_START pulse.

A packet creator 341 creates null packets 343 according to ISO 13818-1.

MIP packet creator 345 generates an output MIP packet 347 using the output modulation parameters 337, counter output, the system time stamp fields synchronization time stamps (e.g., the time interval between the time reference and the start of the next Mega-frame, for example, as defined by ETS 101 191.), which are reset to incoming values every EMF_START pulse 329.

Processor 350 receives the count from counter 340 and a signal 351 indicating the memory 330 is empty. For each count of from counter 340, the processor 350 determines whether to insert a null packet 343, a MIP 347 with output parameters, or a packet from the FIFO 330. The determination is based on a maximum priority for the MIP, normal priority for transport stream packets, and lowest priority for null packets in the case the FIFO is empty. The transport stream selector receives an indicator of what type of packet to insert in the transport stream. According to the indication, the selector 360 creates the output transport stream, selecting between MIP packets 347, transport stream packets read from the FIFO memory 330, and null packets 343. The output transport stream is delivered to output connector TS output 370 according to the output bit rate determined by the NCO 335.

The system and methods described herein provide the ability to send additional information in parallel with a standard MIP while adhering to existing technical standards. The master MIP inserter 110 inserts watermarks suitable for use by MIP re-generators 130 to achieve synchronous re-generations of the transport stream. Two examples of ways to insert watermarks are now described: A) inserting an extended synchronization function in the function field of the MIP, and B) using values with special meaning for pointer value.

Inserting an Extended Synchronization Function in the Function Field of the MIP

ETS 101 191 defines some functions and provides for the possibility to extend functions with new functions. Accordingly, an Extended Synchronization Function is defined with the protocol as per Table 1.

TABLE 1

| Syntax | Number of bit | Identifier |
| --- | --- | --- |
| Extralong_Synchronization _Function ( ) { | | |
| function tag | 8 | uimsbf |
| function_length | 8 | uimsbf |
| extralong_mega_frame_pointer | 16 | uimsbf |
| continuity_counter_sync_value_1_32 | 4 | uimsbf |
| continuity counter sync value 1 16 | 4 | uimsbf |
| continuity_counter_sync_value_1_8 | 4 | uimsbf |
| continuity_counter_sync_value_1_4 | 4 | uimsbf |
| } | | |

The Extended Synchronization Function may use a tag value within the reserved-for-future use range until ETSI approves a dedicated tag. The Extended Synchronization Function carries a Function Length, Extra long Mega Frame Pointer, and Continuity Counter Sync Values.

The Function Length may be a fixed value 0x06. The Extra-long Mega Frame Pointer is computed by incrementing a counter for each MIP inserted with modulus chosen according to the Guard Time used in master MIP inserter from values in Table 2.

TABLE 2

| 1/4 | 1/8 | 1/16 | 1/32 |
| --- | --- | --- | --- |
| 1,683 | 1,870 | 1,980 | 2,040 |

In case the system does not require re-generating the Transport Stream to all other Guard Times, it is possible to use a smaller module according to which Guard Time is required as indicated in Table 3.

TABLE 3

| REGEN | | | | MASTER | | | |
| --- | --- | --- | --- | --- | --- | --- | --- |
| 1/4 | 1/8 | 1/16 | 1/32 | 1/4 | 1/8 | 1/16 | 1/32 |
| NO | NO | NO | YES | 33 | 33 | 33 | 1 |
| NO | NO | YES | NO | 17 | 17 | 1 | 34 |
| NO | NO | YES | YES | 561 | 561 | 33 | 34 |
| NO | YES | NO | NO | 9 | 1 | 18 | 36 |
| NO | YES | NO | YES | 297 | 297 | 594 | 36 |
| NO | YES | YES | NO | 153 | 153 | 153 | 612 |
| NO | YES | YES | YES | 1,683 | 1,683 | 1,782 | 1,836 |
| YES | NO | NO | NO | 1 | 10 | 20 | 40 |
| YES | NO | NO | YES | 33 | 330 | 660 | 40 |
| YES | NO | YES | NO | 17 | 10 | 20 | 680 |
| YES | NO | YES | YES | 561 | 1,870 | 1,320 | 680 |
| YES | YES | NO | NO | 9 | 20 | 180 | 360 |
| YES | YES | NO | YES | 99 | 1,980 | 1,980 | 360 |
| YES | YES | YES | NO | 153 | 2,040 | 1,980 | 2,040 |
| YES | YES | YES | YES | 1,683 | 1,870 | 1,980 | 2,040 |

Continuity Counter Sync Values are a 2 byte word where each 4 bit nibble carries the Continuity Counter for one specific Guard Time. Where target Guard Time is equal to current Guard Time, a nibble is equal to Transport Stream MIP Continuity Counter. For other target Guard Times, nibble values are computed as integer rounded to +infinity of the ratio between the integral of master Mega Frame period and the Mega Frame period of re-generated Guard Time, truncated to 4 bits, as expressed in Equation 1.

$$CC\_GTregen_N = int(MFperiod_{master} * N/MFperiod_{regenX} + 0.9999) \bmod 16$$

Using Values with Special Meaning for Pointer Values

Pointer values in standard ETS 101 191 can be any value, and a flag has to be set in case this value is not constant; therefore using specific values is legal. The pointer value changes over a period are labeled Extra-Long Mega Frame (EMF) which consists of n Mega Frames. Two examples of ways to compute pointer values are provided.

Process 1: In this example, provides computing the pointer value by linearly incrementing between 2 values. In this example, the pointer value starts at value A and increases with each MIP up to a value A+B−1. Value B depends on the guard interval used at the location. A+B must be lower than the number of Transport Stream Packets comprising one Mega Frame minus 1. Table 4 shows possible values for B according to Guard Times used by the master MIP inserter 110.

TABLE 4

| 1/4 | 1/8 | 1/16 | 1/32 |
|---|---|---|---|
| 26,928 | 29,920 | 31,680 | 32,640 |

If there is no requirement in the system that the transport stream is regenerated to any other guard time, smaller numbers for B may be used indicated in Table 5.

TABLE 5

| REGEN | | | | MASTER | | | |
|---|---|---|---|---|---|---|---|
| 1/4 | 1/8 | 1/16 | 1/32 | 1/4 | 1/8 | 1/16 | 1/32 |
| NO | NO | NO | YES | 528 | 528 | 528 | 16 |
| NO | NO | YES | NO | 272 | 272 | 16 | 544 |
| NO | NO | YES | YES | 8,976 | 8,976 | 528 | 544 |
| NO | YES | NO | NO | 144 | 16 | 288 | 576 |
| NO | YES | NO | YES | 4,752 | 4,752 | 9,504 | 576 |
| NO | YES | YES | NO | 2,448 | 2,448 | 2,448 | 9,792 |
| NO | YES | YES | YES | 26,928 | 26,928 | 28,512 | 29,376 |
| YES | NO | NO | NO | 16 | 160 | 320 | 640 |
| YES | NO | NO | YES | 528 | 5,280 | 10,560 | 640 |
| YES | NO | YES | NO | 272 | 160 | 320 | 10,880 |
| YES | NO | YES | YES | 8,976 | 29,920 | 21,120 | 10,880 |
| YES | YES | NO | NO | 144 | 320 | 2,880 | 5,760 |
| YES | YES | NO | YES | 1,584 | 31,680 | 31,680 | 5,760 |
| YES | YES | YES | NO | 2,448 | 32,640 | 31,680 | 32,640 |
| YES | YES | YES | YES | 26,928 | 29,920 | 31,680 | 32,640 |

Process 2: In a second example, the pointer value may be computed with hard coded values signaling reset times of Extra-Long Mega Frame counters. 64 arbitrary pointer values may be selected provided they are lower than the number of Transport Stream Packets comprising one Mega Frame minus 1. Three Extra-long Mega Frame counters with modulus as per Table 1 or Table 2, according to the Guard Time used by the master MIP inserter 110 and according to a requirement of full or reduced re-generation capabilities are used. Using three Continuity Counters computing engine, Continuity Counters values for other Guard Times are computed as integer rounded to +infinity of the ratio between the integral of master Mega Frame period and the mega frame period of re-generated guard time, truncated to 4 bits, as expressed in Equation 1 above. A 6 bit word may be formed to select among 64 pointer values with overflow conditions of 3 Extra-long Mega Frame counters and 3 Continuity Counters.

Of course other similar methods may be used. Other aspects of the master MIP inserter 110 may be identical to those found in any MIP inserter. The system uses the pointer field or Extended Synchronization Function inserted at master MIP inserter 110 to achieve a totally synchronous operation within the network. Each periodic element of the re-generated Transport Stream is derived from a counter which is reset every Extra-long Mega Frame. Using the pointer field values or Extra-long Mega Frame Pointer, the MIP regenerator 130 synchronizes a local counter which counts the number of incoming MIPs. If the Extended Synchronization Function is used, the local counter has the value of Extra long Mega Frame Pointer.

If process 1 for pointer computation (i.e., a linear increment between 2 values) is used, the local counter has the value of the pointer field minus value A. Value A is computed when the pointer value decreases, as value A is the pointer minimum value. If process 2 for pointer computation (i.e., coded values) is used, the local counter is reset at specific values. Length of Extra-long Mega Frame counting is derived from modulation parameters, once one method is selected.

Key conditions for SFN operations are:
MIP position;
MIP content;
exact interleaving of MIP, transport stream packets, and null packets.

The first condition for MIP position is achieved with the Extra-long Mega Frame counter. Any MIP re-generator 130 inserts one MIP at the same position as in the incoming stream every EMF length, and from this point a MIP is inserted at fixed distance.

The second condition is achieved since most of the MIP content is modulation independent and may be passed to re-generate the MIP. However, three fields are affected. The first field that may require change is the system parameters field. The system parameters field must reflect any different modulation scheme chosen for a new transport stream. The second field requiring change is the System Time Stamp (STS). The System Time Stamp field increases linearly by a fixed amount every Mega Frame, and the amount is modulation parameters dependent.

The EMF length is chosen such that there is always an integer number of MIPs within an EMF period. For example, (the number of MIPs in the EMF period of the incoming transport stream)×(the elementary delay increase for the incomings stream modulation parameters)=(the number of MIPs in the outgoing Transport Stream)×(the elementary delay required for the outgoing Transport Stream). This relationship means that once the STS is reset with the STS value of the incoming MIP at the EMF reset, the STS at the end of the next EMF count is the same in the incoming transport stream and the outgoing transport stream, and this is true for any MIP re-generator 130 in the system.

The third field requiring change is continuity counter field. The continuity counter field changes every MIP by increasing a four bit value. As a result, there are three ways to achieve synchronous values:

1) if the Extended Synchronization Function is present, one of the Continuity Counter Sync Values is used as Continuity Counter value;

2) if a pointer with linear increments is used, the Continuity Counter value is reset to 0 when pointer is reset at value A;

3) if coded pointers are used, the Continuity Counter value is reset to 0 for specific pointer values.

The third condition for interleaving packets to create the output transport stream is achieved if it is assumed that the input FIFO is empty every time a MIP is received, which is also a EMF reset. This allows all re-generators to restart the process of selecting packets to form the output stream from a known point, and all elements for the determination of inserting an MIP, an incoming transport stream packet, or a null packet are synchronized in every MIP re-generator 130, and the decision is the same in every re-generator.

The system and processes explained above show how to create a Mega-frame Initialization Packet such that remote MIP inserters can regenerate Transport Stream bit rate and MIPs for Single Frequency Networks with modulation schemes different from an incoming one in a totally deterministic way. This process guarantees that all MIP re-generators having the same signal at the input and having the same modulation scheme generate exactly the same stream (bit exact) even in multiple locations.

It will be appreciated the master MIP inserter 110 and MIP re-generators 130 may be implemented by a combination of hardware and software including hardwired logic, switches, integrated circuits, and buffers and/or software applications provided from one or more memory devices interpreted by one or more processing devices. The processing devices may be implemented using any general-purpose or special purpose computing device, such as, for example, a processor, a digital signal processor, a microcomputer, a field programmable array, a programmable logic unit, a microprocessor or any other device capable of responding to and executing instructions in a defined manner. The processing device may run one or more of the software applications including the special functions provided herein. The processing device also may access, store, manipulate, process, and create data in response to the applications. The software applications may include a computer program, a piece of code, an instruction, or some combination thereof, for independently or collectively instructing the processing device to operate as desired.

The applications, content, and data may be embodied permanently or temporarily in any type of machine, component, physical or virtual equipment, storage medium or device, or propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a hard disk, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A method of modifying a transport stream for use by at least two Single Frequency Networks (SFNs), each having a different modulation scheme, the method comprising:
    receiving an input transport stream of packets including a number of mega frames;
    extracting mega frame information from the packets;
    determining the start of a mega frame;
    counting the packets;
    generating a watermark using the extracted mega frame information, the packet count, and modulation parameters of the different modulation schemes for synchronous re-multiplexing of the transport stream using either of the different modulation schemes of the at least two SFNs;
    generating an Mega-Frame Initialization Packet (MIP) including the watermark;
    inserting the MIP in each mega frame of an output transport stream of packets at a position in the mega frame corresponding to the number of the mega frame in the output transport stream; and
    outputting the transport stream.

2. The method of claim 1 further comprising restarting the counting at the start of every mega frame.

3. The method of claim 1 wherein the watermark is an extended synchronization function placed in the function field B of the MIP.

4. The method of claim 3 wherein the function field includes a function length, an extra long mega frame (EMF) pointer, and continuity counter sync values.

5. The method of claim 4 wherein the continuity counter sync values are integers rounded to infinity of a ratio between the integral of a master mega frame period and a mega frame period of a regenerated guard time.

6. The method of claim 1 wherein the watermark is a pointer value that changes over a period of an extra long mega frame (EMF).

7. The method of claim 6 wherein the pointer is computed as a linear increment between two values A and B, where the pointer value starts at A and increases with each received MIP up to a value of A+B−1 and where A+B is less than the number of transport stream packets in a mega frame minus one.

8. The method of claim 7 wherein B is chosen based on the guard interval of a specific location in the network.

9. The method of claim 6 wherein the pointer value is coded with hard coded values signaling reset times of EMF counters.

10. The method of claim 1 wherein each timing element of any regenerated transport stream in the networks is derived from a local counter that is reset every extra long mega frame period and the local counter is synchronized each mega frame based on the watermark of the MIP.

11. A master mega-frame initialization packet (MIP) generator for modifying a transport stream for use by at least two Single Frequency Networks (SFNs), each having a different modulation scheme, the generator comprising:
    an input configured to receive a transport stream of packets including a number of mega frames;
    a detector configured to extract mega frame information from the packets and determine the start of a mega frame;
    a counter configured to count the packets;
    a processor configured to:
        generate an MIP packet including a special watermark using based on the extracted MF information, the packet count, and modulation parameters of the different modulation schemes for synchronous re-multiplexing of the transport stream using either of the different modulation schemes of the at least two SFNs;
        generate an MIP packet including the watermark; and
        insert the MIP packet in each mega frame of an output transport stream of packets at a position in the mega frame corresponding to the number of the mega frame in the output transport stream; and
    an output configured to output the transport stream.

12. The generator of claim 11 wherein the counter is restarted at the start of every mega frame.

13. The generator of claim 11 wherein the watermark is an extended synchronization function placed in the function field of the MIP.

14. The generator of claim 13 wherein the function field includes a function length, an extra long mega frame (EMF) pointer, and continuity counter sync values.

15. The method of claim 14 wherein the continuity counter sync values are integers rounded to infinity of a ratio between the integral of a master mega frame period and a mega frame period of a regenerated guard time.

16. The generator of claim 11 wherein the watermark is a pointer value that changes over a period of an extra long mega frame (EMF).

17. The generator of claim 16 wherein the pointer is computed as a linear increment between two values A and B, where the pointer value starts at A and increases with each received MIP up to a value of A+B−1 and where A+B is less than the number of transport stream packets in a mega frame minus one.

18. The generator of claim 17 wherein B is chosen based on the guard interval of a specific location in the network.

19. The generator of claim 16 wherein the pointer value is codes with values signal reset times of EMF counters.

20. The generator of claim 11 wherein each timing element of any regenerated transport stream in the networks is derived from a local counter that is reset every extra long mega frame period and the local counter is synchronized each mega frame based on the watermark of the MIP.

* * * * *